3,020,791
PENDULOUS TEMPLET HOLDER
René Jean Nicolas Le Brusque, Malakoff, France, assignor to H. Ernault-Batignolles S.A., Paris, France, a company of France
Filed July 16, 1958, Ser. No. 748,838
Claims priority, application France July 23, 1957
11 Claims. (Cl. 82—14)

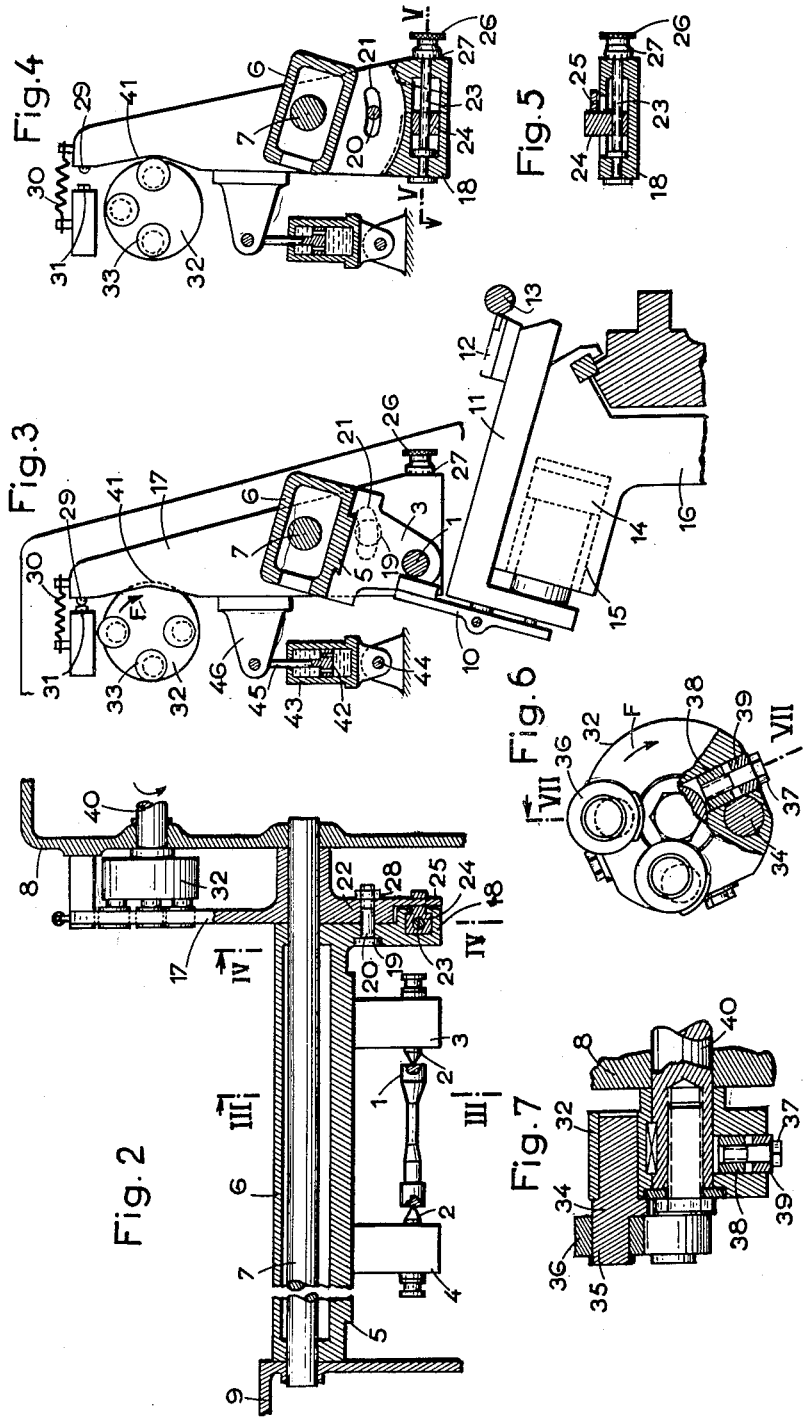

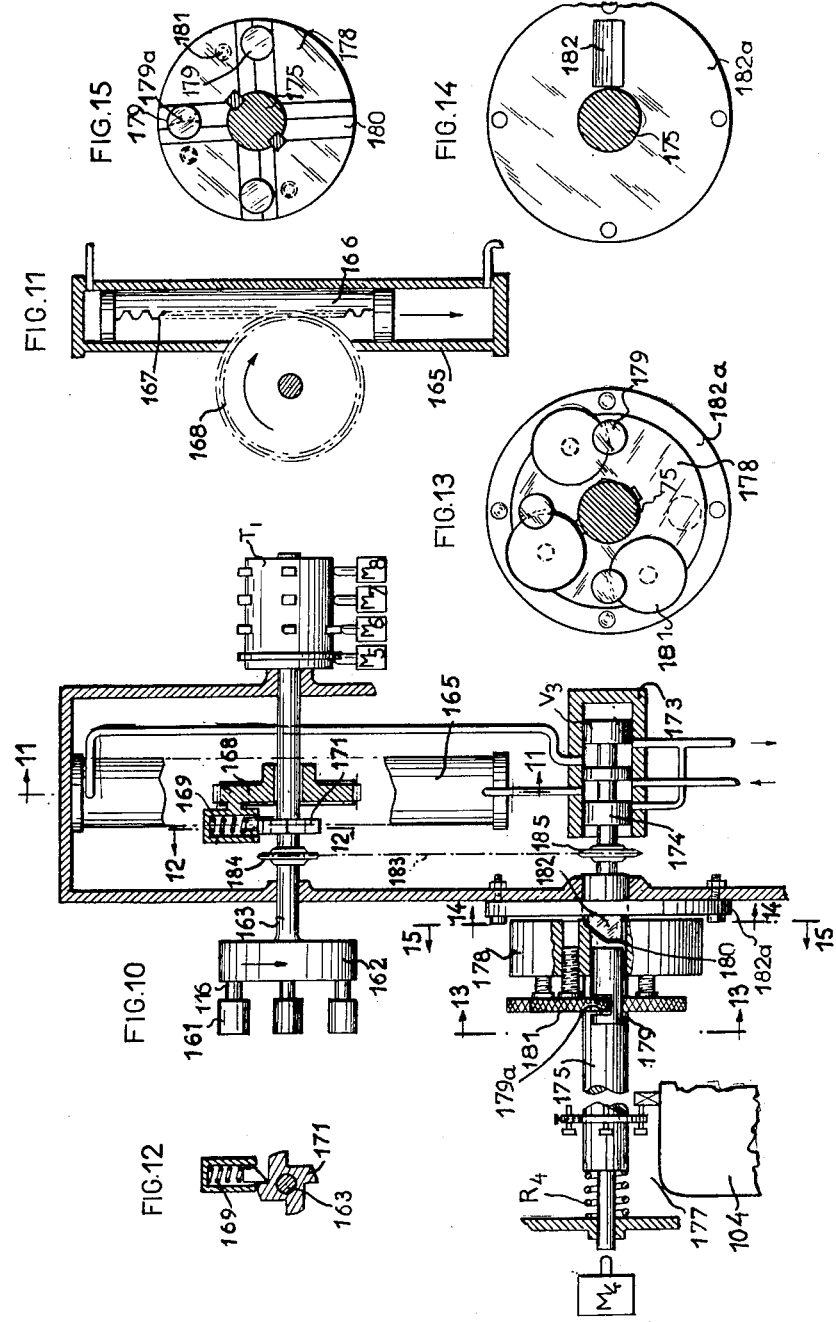

This invention relates to a pendulous templet-holder of the type adapted to control the position of a tool with respect to the bed of a machine-tool such as a copying-lathe.

More particularly—but not exclusively, the invention concerns a templet-holder of this type capable of controlling a cycle of working operations including at least a roughing cut and a finishing pass.

Known templet-holders of the type described, for example, in my copending application Serial No. 534,127, filed Sept. 13, 1955, now Patent No. 2,966,084, issued Dec. 27, 1960, include adjustment devices comprising at least one adjustable abutment member mounted on the lathe bed and essentially constituted by a push rod having threaded portions so that its length may be varied to adjust the angular position at which the templet-holder is to be stopped by the said abutment.

These known devices have the drawback, in particular from the point of view of the accuracy of the finishing pass, of being submitted to the influence of uncontrollable backlash between the lathe bed and the abutment member as well as in the mechanism provided for adjusting the latter.

Furthermore, in these known devices, the relative position in space of the abutment member mounted on the lathe-bed with respect to that portion of the templet-holder which comes into contact with said abutment member varies with the angular position in which the templet-holder is stopped, since the latter oscillates around its axis of suspension while the adjustment of the abutment member takes place along a straight stroke. Under these conditions, the common surface of contact is necessarily reduced to a point or at least to a line, so that one of the abutting parts is liable to wear out with time, thus jeopardizing the accuracy of the machining operations.

An object of the invention is to provide a pendulous templet-holder of the type described with abutment means of greater accuracy.

Another object of the invention is to ensure, to a high degree, the accuracy of the abutment means of a pendulous templet-holder, for a long period of use.

Still another object of the invention is to provide a pendulous templet-holder of the type described, with adjustable means offering no backlash.

A further object of the invention is to provide adjustable abutment means capable of being made rigid with the templet-holder after each adjusting operation.

Still another object of the invention is to provide abutment means which, while permitting adjustment of the angular position in which the templet-holder is to be stopped and while being capable of being made rigid with the templet-holder after each adjusting operation, nevertheless permit reproducing the same conditions of contact between the templet-holder and the lathe-bed and, in particular, full contact between two precisely machined abutment surfaces of considerable area, whatever may be the angular position in which the templet-holder is stopped.

A further object of the invention is to provide a pendulous templet-holder comprising two members, the first one of which constitutes the templet-holder proper, while the relative position of the second member with respect to the first one, may be adjusted by a displacement in a plane normal to the axis of oscillation to vary the angular position in which the templet-holder is to be stopped. The stopping of the templet-holder is ensured by a reference abutment fixedly secured on the machine-bed and against which the above-mentioned second member is adapted to come into contact, means being furthermore provided to make the said second member rigid with the templet-holder proper in any desired position relationship thereof. Finally, the relative positioning of the two members of the templet-holder is ensured by means of an accurate adjusting device independent of the above-mentioned stopping means.

With this arrangement, the reference abutment is directly carried by the machine-bed and forms one therewith. Moreover, once the two above-mentioned members have been made rigid with each other by the previously mentioned independent means, the said elements form a rigid assembly which eliminates any backlash other than that about the oscillation axis of the templet-holder. Finally, since the accurate adjusting means are independent of the means provided to make the two members rigid with each other, the said adjusting means are not subjected to any stress when the rigid assembly strikes on the bed.

The first member, which is provided with templet-holding means and which is designed to keep the axis of a templet parallel to the machining axis while oscillating will be called hereinafter, in the specification as well as in the appended claims "the templet-holding member" while the second member which has for its function to limit the oscillation of the first one will be called "the stopping member."

Still another object of the invention is to provide the stopping member and the reference abutment with two conjugate accurately machined abutment surfaces, and to provide between the two members of the templet-holder such facilities of relative positioning that, the said contact surfaces being pressed flat against each other, the angular position of the templet holding member can be varied and the two members be made rigid with each other, without disturbing these conditions of contact. There is thus established between the oscillating assembly and the machine-bed a full, neat and accurate abutment contact which will be reproduced whenever the oscillating assembly comes into contact with the machine-bed and these accurate conditions of abutment can only but improve with time, due to hammering effect.

Still another object of the invention is to pivot the stopping member around the axis of oscillation of the templet-holding member so that whenever stopped by the said abutment, the said stopping member always assumes in space the same relative position with respect to the machine-bed, whatever may be the relative positioning of the two members and hence, whatever may be the angular position in which the templet-holding member is stopped.

It is therefore another object of the invention to provide the said stopping member with a rigid accurately machined striking abutment adapted to establish a neat and full contact, on as great an area as desired, with the reference abutment of the machine-bed, such a rigid striking abutment having the further advantage of not being liable to get out of adjustment.

A further object of the invention is to provide a pendulous templet-holder of the type described, capable of ensuring automatic machining cycles in a very simple manner in a lathe in which the templet-holder cooperates with successive machining abutments carried on a rotating barrel.

It is then easy to automatically bring the said abutments one after the other in their operative position whenever the lathe-carriage reaches its end-of-stroke position after having effected a machining pass.

For this purpose, it is another object of the invention to provide for the said rotating barrel, an indexing device which is actuated whenever a machining pass is completed by the lathe-carriage, so as to withdraw that abutment which has been used during the said pass and so as to bring the next abutment into operative position for the following pass.

Furthermore, since, for each one of the machining passes of a cycle, the templet-holder cooperates with a well-defined abutment, the barrel carrying the abutments also assumes a well-defined angular position.

It is therefore another object of the invention to distribute, for each machining pass which will be called hereinafter a "step" of a cycle, the conditions of working or of displacement of the tool (e.g. normal feeding speed, reduced feeding speed, accelerated approach or withdrawal, quick return, etc).

With that arrangement, the templet-holder may be given a very simple, purely revolution shape, substantially reproducing the outline of the workpiece, since the templet-holder only has to determine the shape of the piece which is being machined while in a prior solution the templet-holder had both to reproduce the shape of a workpiece and to determine the conditions of work of the tool, which required complex shaping of the templet-holder.

Still a further object of the invention is to provide control electric circuits adapted to be prepared by contacts actuated by the abutment-carrying barrel, the arrangement being such that each angular position of the said barrel causes the preparation of an electric circuit permitting the establishment of the desired feed conditions.

Still a further object of the invention is to provide a device of the type described wherein the above-mentioned electric contacts are carried by a rotary function drum keyed on the shaft on which is mounted the abutment-carrying barrel or, at least, rotated with the said shaft.

Now it is known to effectively establish the required conditions of work of the tool by means of devices actuated from control electric circuits, combined with authorizing electric circuits and completed by contacts actuated at times corresponding to certain relative longitudinal positions of the tool with respect to the workpiece which is being machined i.e. to certain positions of the lathe-carriage on the bed.

It is however, a particular object of the invention to dispose the contacts of the above-mentioned control circuits on a rotary drum having its angular positions related to the longitudinal positions of the carriage with such a relationship that each one of said longitudinal positions corresponds to a well-defined angular position of the drum and, hence, to a well-defined configuration of the control electric circuits.

A more specific object of the invention is to associate the drum carrying the contacts of the control circuits with a high pitch screw which meshes with a nut forming one with the lathe-carriage, so that the longitudinal displacements of the latter are transformed into rotational movements of the screw and, hence, of the drum.

The templet-holder according to the invention is also adapted to be used for other automatic machining cycles wherein one or more steps are omitted i.e. wherein the templet-holder "misses" one or more abutments during the automatic shifting of the latter.

For this purpose, it is yet a further object of the invention to provide an automatic indexing device for the abutment-carrying barrel to normally pivot the said barrel stepwise by an angle ensuring the substitution for any abutment of the next following one, as well as a selecting device hereinafter called an "erasing device" which, when required, inhibits the action of the said indexing device at the end of one step, while ensuring the next following step without any discontinuity.

While the above-mentioned objects more particularly relate to a copying-lathe, it is to be well understood that they refer to any other copying-machine as well, such as a reproducing milling machine, or the like.

Other objects and advantages of the invention will be apparent from the following detailed description, together with the accompanying drawings submitted for purpose of illustration only and not intended to limit the scope of the invention, reference being had for that purpose to the sub-joined claims.

In the drawings:

FIG. 2 is a longitudinal sectional view through the axis of oscillation of the templet-holder in FIG. 1;

FIG. 3 is a cross-sectional view along the lines III—III in FIG. 2, showing the stop-device in the position of the templet-holder corresponding to a finishing pass;

FIG. 4 is a similar view to that in FIG. 3, this time showing the stop-device in the position for which the templet-holder provides a roughing cut;

FIG. 5 is a section along the lines V—V in FIG. 4, showing the stop-device adjustment mechanism;

FIG. 6 is a larger-scale end view, with partial cut-away, of the stop-drum used for the roughing cuts;

FIG. 7 is a section along the lines VII—VII of FIG. 6;

FIG. 10 is a partially sectional front view, also on a larger scale, of the movable-stop device of the templet-holder and its control system;

FIGS. 11 to 15 are partial sections, respectively along the lines 11—11, 12—12, 13—13, 14—14 and 15—15 in FIG. 10.

Figure 1:
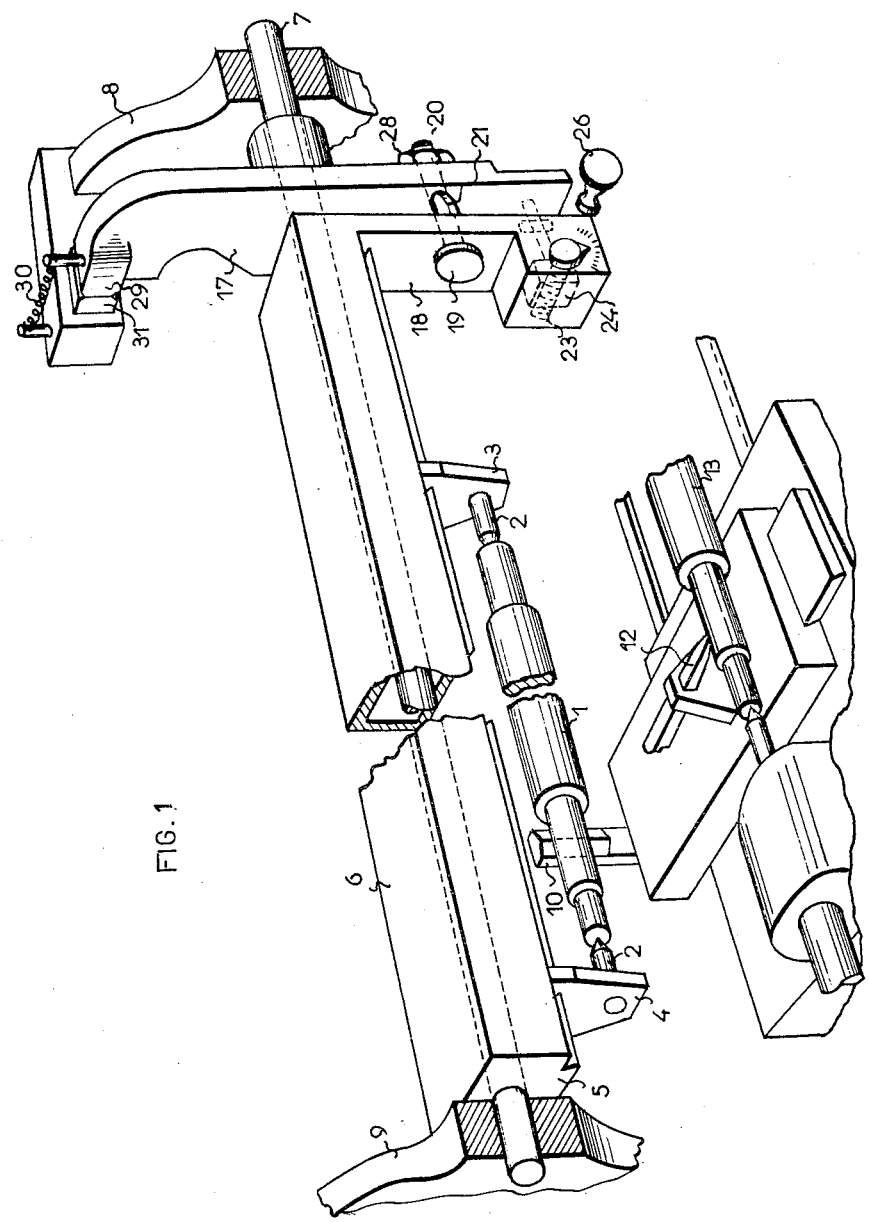
FIG. 1 is a perspective view of a templet-holder according to the invention.

As shown in FIGS. 1 and 2, the templet 1 is held between the fixed centres 2 of two rams 3 and 4 mounted on a slide 5 forming one with a templet-holder 6, the latter being capable of oscillation about a fixed spindle 7 which is parallel to the axis of longitudinal traverse and integral with end supporting brackets 8 and 9 fixed to the machine stand.

A feeler 10 (FIG. 3) in contact with the templet 1 is mounted on the copying tool-rest or slide 11 carrying the tool 12, cross-traverse of which, relative to the workpiece 13, is controlled in the manner well-known per se by the action of the feeler 10 on delivery of propulsive fluid to a piston 14 which is integral with the copying tool-rest and which is displaced inside a cylinder 15 formed in the saddle 16 providing longitudinal traverse.

According to the invention, a lever or stopping-member 17 is loosely mounted on the fixed spindle 7, next to the fixed support 8.

The templet-holder 6 and the lever 17 form a rotatable whole about the spindle 7 and have adjustable angular displacement with respect to each other. To this effect, the templet-holder 6 is provided with an arm 18 in which is centered a bolt 19 the shank 20 of which passes through a slit 21 embodied in an arm 22 of the lever 17.

Furthermore, a micrometric screw 23, rotating in a bearing incorporated into the lower part of the arm 18, engages with a floating nut 24 which in turn cooperates with a downward extension piece 25 integral with the arm 22 of lever 17 (FIGS. 4 and 5). The screw 23 is operated by means of a handwheel 26 fitted with a vernier 27 which provides a reading of the angular position of the templet-holder 6 relative to the lever 17.

Tightening up the nut 28 of bolt 19 enables the templet-holder 6 and the lever 17 to be rigidly locked together in each of their relative angular positions, which angular positions are in turn governed by abutment of the extension piece 25 against the floating nut 24.

At its end opposite the arm 22, the lever 17 carries a nipple 29 which, under the action of a spring 30, is designed to bear up against a reference stop 31 fixed to the support 8.

As will be appreciated, all that is required is to adjust the arm 18 of the templet-holder 6 and the arm 22 of the lever 17 to a relative angular displacement—with the aid of the handwheel 26, after loosening the nut 28—such that, with the nipple 29 in contact with the reference stop 31, the templet 1 occupies a position wherein the distance between the tool 12 and the axis of the workpiece 13 exactly corresponds to dimensioning requirements for the latter. Such an adjustment remains valid so long as the distance between the point of the tool 12 and that of the feeler 10, with the latter in its position of equilibrium, has not altered.

Each fresh adjustment consists in modifying the angular displacement between the templet-holder 6 and the lever 17.

Such adjustment of the angular displacement between the templet-holder 6 and the lever 17 is likewise valid, in accordance with the invention, for such roughing cuts as may be required prior to the finishing pass.

For this purpose, the fixed support 8 is equipped with a rotary drum 32 in addition to the reference stop 31, which rotary drum carries a plurality of stops 33 which are successively brought into play by rotation of said drum so as to cooperate with the lever 17 forming one with the templet-holder 6.

The structure of this rotary drum 32 is shown, on a larger scale, in FIGS. 6 and 7.

Centered along the same circumference of the drum body 32, and angularly spaced at 90 degrees respectively, are three spindles 34 each provided with a stub-shaft 35 which is eccentric relative to the spindle 34 and on which is mounted a plain roller or a roller-bearing 36 designed to constitute one of said stops 33. Each spindle is rendered rotationally immovable by locking means consisting of a screw 37 and two sleeves 38 and 39 which are guided in the body 32 of the drum.

The drum assembly is keyed to a shaft 40 which is parallel to the axis 7 of the templet-holder and which is rotatable in a bearing embodied in the support 8. This shaft is rotated periodically by an actuator (not shown) which may be servo-controlled in accordance with the cycle of operation it is desired to perform.

The eccentricity of the stub-shafts 35 relative to their respective spindles 34 enables the stops 33 to be located at various distances from the axis of the drum 32.

Facing the drum 32, the lever 17 has the shape of a concave cam 41.

In the particular position of lever 17 shown in FIG. 3—which corresponds to the finishing pass—none of the stops 33 are in contact with the cam 41, and the lever 17 bears against the reference stop 31.

When machining a fresh workpiece for which three roughing cuts are required, an initial 90-degree rotation of shaft 40 in the direction of the arrow F causes the stop 33 most distant from the axis of the drum 32 to come into contact with the cam 41 of lever 17. The latter then moves away from the reference stop 31, carrying with it the templet-holder 6 and the templet 1 by rotation about the axle 7.

The feeler 10 produces traversing of the copying tool-rest 11 according to the fresh position now occupied by the templet 1, and the tool then effects the corresponding roughing cut.

For the second and third roughing cuts, the drum 32 is rotated in the same direction so as to fetch the other two stops 33 into successive contact with the cam 41; these other two stops determine two fresh angular positions of the lever 17 and hence of the templet-holder 6. After the last of the stops 33 has moved past the cam 41, the lever 17 abuts against the reference stop 31 once more and the templet-holder 6 then occupies the position corresponding to the finishing pass.

Oscillation movements of the lever 17, in the direction of contact-making with the reference stop 31, can be damped by means of a dash-pot consisting of a piston 42 provided with calibrated passages which is displaced inside a cylinder 43 filled with liquid, the cylinder being articulated on the fixed support 8 at 44; the piston 42 is linked to a bracket 46 forming one with the lever 17 via a rod 45.

The copying lathe shown in FIGS. 8 to 16 incorporates a bed 101 provided with two horizontal slide-ways 102, 103, along which may travel a saddle or carriage 104 under the action of a hydraulic feed device. This hydraulic feed device comprises a piston 105 the rod 106 of which is connected to the saddle, and which is movable within a cylinder 107 to which is associated a distributor 108. This type of hydraulic control unit is well-known per se and does not form part of the invention.

Figure 9:
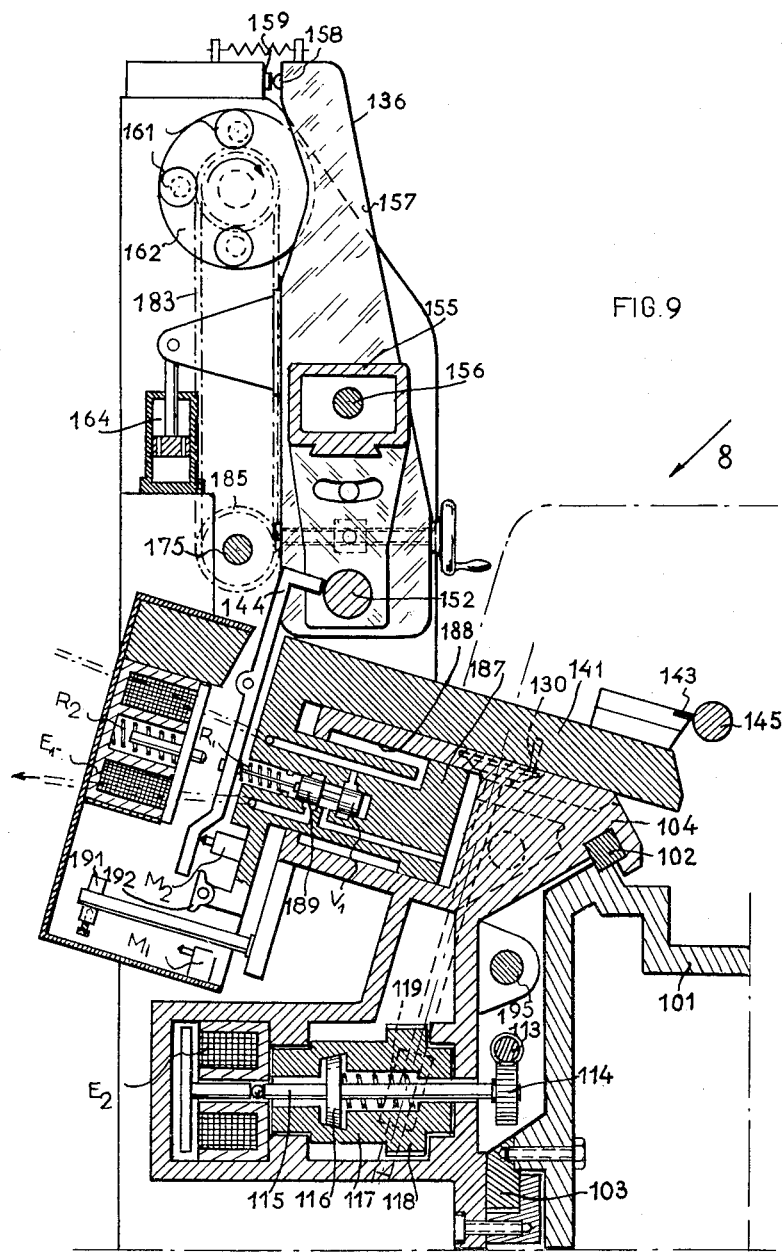
FIG. 9 is a vertical cross-section, on a larger scale, substantially along the line 9—9 of FIG. 8.

Consequently, this device will not be described in detail; it will simply be recalled to mind that the rod 111 of the slide-valve V2 of the distributor 108 is axially connected, via a rotary joint 112, to a lead-screw 113 which is parallel to the direction of travel of the saddle 104 and which meshes with a pinion 114 (FIG. 9) integral with a shaft 115 mounted inside the saddle. The pinion 114 may be rendered integral with the saddle by means of an electro-mechanical clutch 116 the controlling electromagnet of which is shown at E2. To be more precise, the shaft 115 is mounted in a hub 117 provided with teeth 118 which mesh with a worm 119 (shown in dashes on FIG. 9). The worm 119 serves to immobilize the hub 118 during automatic feed; it also serves as a control member for manual feed, in conjunction with the hand wheel 130 (FIG. 9).

Figure 8:
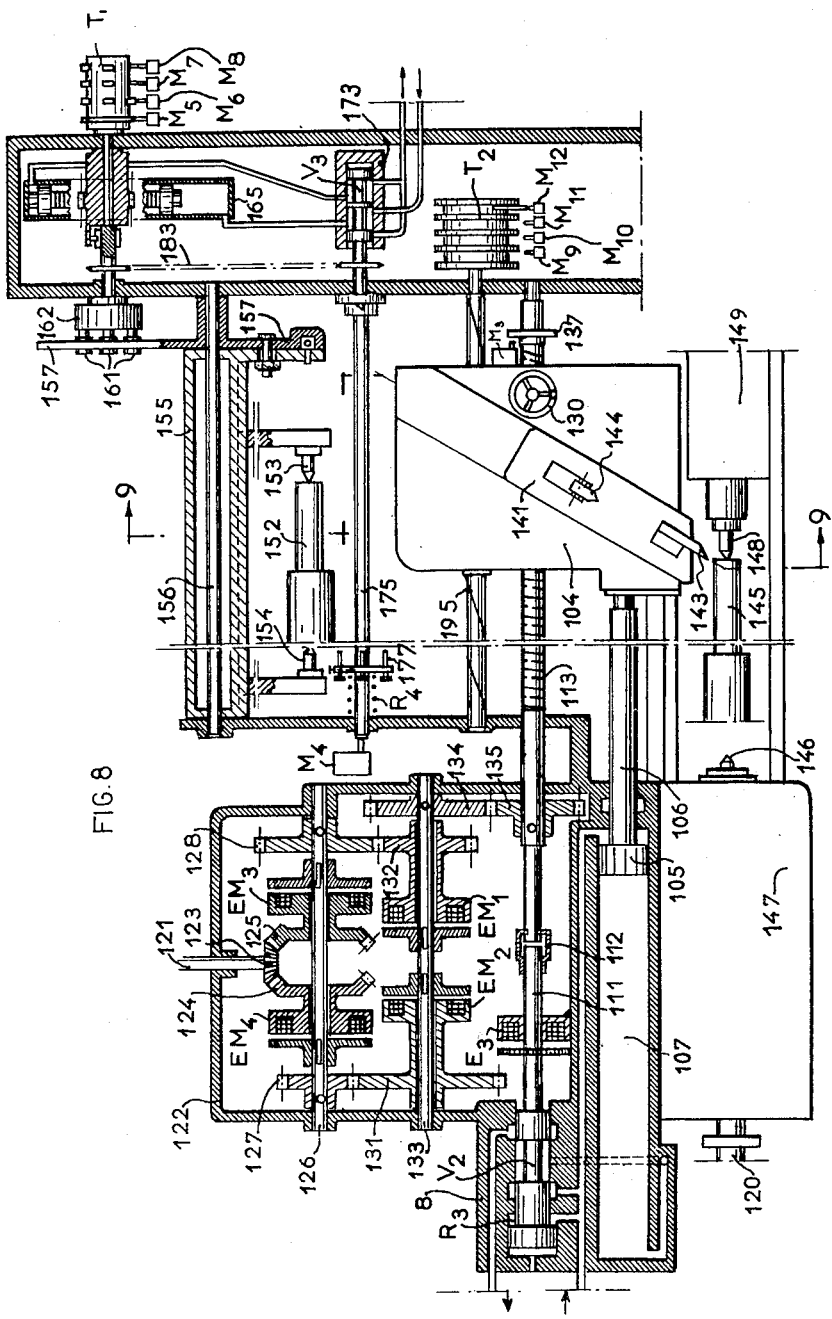
FIG. 8 is a partially sectional view, seen substantially along the oblique direction of the arrow 8 in FIG. 9 (the templet, however, being shown at a distance from the feeler for clarity purposes), of a copying lathe according to the invention.

The lead-screw 113 is acted upon by a cushion of fluid which is shown at R3 in FIG. 8 and which tends to push the slide-valve V2 of the distributor towards the left of this figure. An electromagnet E3 (FIGS. 8 and 15) pulls the distributor rod axially in the opposite direction. The lead-screw 113 is driven in rotation from a shaft 121 through an electro-mechanical gearbox 122 provided with a reversing gear. On the shaft 121 is keyed a bevel pinion 123 meshing with two bevel gears 124, 125, loosely mounted on a first countershaft 126 and which can be rendered selectively integral with this shaft by means of two electromagnetic clutches EM4 and EM3. On the shaft 126 are keyed two gearwheels 127, 128, of different diameters, respectively meshing with two other gearwheels 131, 132, mounted loosely on a second countershaft 133 and which may be rendered selectively integral with this shaft by means of two further electromagnetic clutches EM2, EM1. On the shaft 133 is keyed a gearwheel 134 meshing with a gear-wheel 135 which is integral with the leadscrew 113. The shaft 121 is driven from a shaft housed in the headstock of the lathe, the speed of this latter shaft being related to that of the workpiece driving spindle.

For a given direction of rotation of the driving shaft 121, the first countershaft 126 rotates in one direction or the other according to whether the clutch which has been engaged is EM4 or EM3. Moreover, the second countershaft 133 is driven at a low speed when the clutch EM2 is engaged, and at high speed when the clutch EM1 is engaged. The direction of rotation of the lead-screw 113 corresponds to that of the countershaft 133, and its speed of rotation is proportional to the speed of this shaft. Lastly, if the two clutches EM1 and EM2 are simultaneously engaged, the whole assembly of gears contained in the gearbox 122 is locked together and the lead-screw rendered rotationally immovable in a positive manner.

The lead-screw 113 carries a thrust-collar 137 with which cooperates a switch M3 carried by the saddle and the function of which will be made explicit hereinafter. The position of the collar 137 is adjustable along the length of the screw 113.

On the saddle 104 is mounted a transverse slide or tool-rest 141 (FIGS. 8 and 9) which can slide in an oblique direction with respect to the direction of travel of the saddle, in order to allow of correct execution of shoulders by a copying process, in accordance with some well-known technique.

The transverse tool-rest 141 carries the turning tool 143 and the feeler 144. The workpiece is shown at 145 and is assumed to be supported between the centre 146 of the fixed headstock 147 of the lathe and the centre 148 of the movable tailstock 149. The workpiece 145 is driven in rotation by the spindle 120 of the lathe by any suitable conventional familiar means. The feeler 144 cooperates with a model or templet 152 which, in FIG. 8, for clarity purposes has been shown to be at a certain distance from said feeler, whereas actually the feeler is in contact with the templet, as may be seen in FIG. 9.

The templet 152 is mounted between centres 153, 154 (FIG. 8) on a templet-holder 155 which, in the embodiment illustrated, is of the type described hereinbefore. This templet-holder is of the pivoting or pendulous type; it can oscillate about a spindle 156 carried by the lathe stand and is provided with an arm 157 capable of cooperating with fixed abutments or stops for roughing cuts and for finishing. To position the templet in readiness for a finishing pass, a nipple 158 on the arm 157 is brought to bear against a reference nipple or stop integral with the lathe stand. For the various roughing cuts, the arm 157 cooperates successively with one of a series of selectively operative stops 161 carried by a rotary disc 162 which is integral with a shaft 163 (see also FIGS. 10 to 12). The stops 161 are mounted on the disc on eccentric pivots, so that the distance of each of these stops from the axis of the disc can be adjusted individually. At 164 is shown a hydraulic damper to control oscillation of the templet-holder.

Rotational indexing movement of the disc 162 is obtained by means of a hydraulic device (see in particular FIG. 11) comprising a cylinder 165 in which travels a long double-acting piston 166, provided with a rack 167 meshing with a gearwheel 168 which carries a pawl device 169 (FIG. 12) cooperating with a ratchet-wheel 171 rigid with the shaft 163, said ratchet-wheel comprising as many teeth as the disc 162 has possible successive angular positions. Total possible travel of the piston 166 is sufficiently great to ensure, if necessary, rotation of the shaft 163 through an angle which is a multiple of the unitary angle included between two successive stops 161. In the particular embodiment illustrated, this angle is equal to three times said unitary angle. Intake of fluid under pressure into the cylinder 165 is effected by a distributor 173 the slide valve 174 of which is integral with a spindle 175 urged towards the right in the drawing by a spring R4 and moved towards the left, against the action of this spring, by a finger 176 carried by the saddle 104 and cooperating with one of the adjustable stops 177 carried by the spindle 175. The number of stops 177 is equal to the number of possible successive angular positions of the disc 162, in order that the finger 176 shall act upon the spindle 175 whatever be the angular position of said spindle which rotates at the same time as the disc 162 in order to control the slide-valve 174. By axially displacing the stops 177, this arrangement furthermore allows obtaining different lengths of travel of the saddle 104 according to the angular position of the disc 162.

In order to be able to reduce the number of passes in an automatic cycle, a device is provided to selectively make one or more of the stops 161 inoperative. This device comprises a dividing plate 178 rigid with the spindle 175 and comprising cylindrical blocks 179, hereinafter referred to as "obstructing members" which are axially displaceable within bores in the plate 178 under the action of individual adjustment screws 181 the knurled heads of which are engaged into notches 179a cut in said obstructing members. A wedge catch 182 integral with a plate 182a fixed to the machine stand is able to penetrate into recesses 180 in plate 178; said wedge catch features a face which is raked in the direction tending to repel the plate 178 and, hence, the spindle 175, towards the left during rotation of the latter. The spindle 175 is driven in rotation through a chain drive 183 comprising two sprocket wheels 184, 185 which are respectively integral with the shaft 163 and the spindle 175. Any obstructing member 179 which is in a withdrawn position, as shown in the drawing, allows the wedge catch 182 to penetrate into the corresponding recess 180 and, as a result, allows the plate 178 and the spindle 175 to return to their extreme right-hand position, whereas any obstructing member which is fully home in the corresponding recess, would meet the wedge catch 182 and would thus prevent such return of the spindle 175 towards the right. Further reference will be made to this device when the operation of the machine is described later.

Movement of the tool-rest 141 on the saddle 104 is effected via a hydraulic system comprising a differential piston 187 rigid with the tool-rest and movable within a cylinder 188 formed in the saddle 104. Intake and discharge of fluid under pressure in the cylinder are effected under control of the feeler or contact arm 144, by means of a distributor featuring a slide-valve 189. A spring R2 urges the feeler in the direction corresponding to withdrawal of the transverse tool-rest, and the action of this spring may be cancelled out by means of an electromagnet E1, so that in the event of a failure in the current, the tool-rest will always tend to withdraw, thus disengaging the tool from the workpiece. An adjustable stop 191 rigid with the saddle cooperates, on the one hand with a rocker 192 mounted on the transverse tool-rest and capable of acting upon the feeler in order to stop said transverse tool-rest at the end of its withdrawal movement, and, on the other, with a switch M1 to control rapid return travel of the saddle. The spring R1, weaker than the spring R2, urges the feeler in the direction controlling advance of the tool-rest.

The hydraulic installations of the machine is electrically controlled, and the automatic machining cycles are carried out according to successive positions of the saddle on its bed and the particular selection made of templet stops.

In the interest of facilitating manufacture, longitudinal position marking for the saddle has been replaced by angular position marking on a rotary function drum T2 rigid with a bar 195 rotating in the lathe stand and into which is cut a high-pitch screw thread meshing with a nut (not shown) rigid with the saddle 104.

Position indicating of the templet is effected by means of another function drum T1 integral with the shaft 163 on which is mounted the plate 162 carrying the stops 161.

The automatic control system for the machining cycles is governed by combinations of electrical contacts which are suitably positioned, in accordance with each particular machining cycle to be carried out, on the two drums T1 and T2. In the particular embodiment shown, the drum T1 controls four switches M5, M7 and M8, which control circuits hereinafter referred to as "authorizing circuits," and the drum T2 controls four other switches M10, M11 and M12, which in turn control a number of circuits which will be hereafter referred to as "control circuits." These switches have been designated as follows:

M5—Continued spindle rotation and authority to re-engage automatic cycle.
M7—Rapid traverse.
M8—Slowed feed.
M10—Authority to initiate cycle.
M11—Rapid traverse.
M12—Slow feed.

Figure 16:
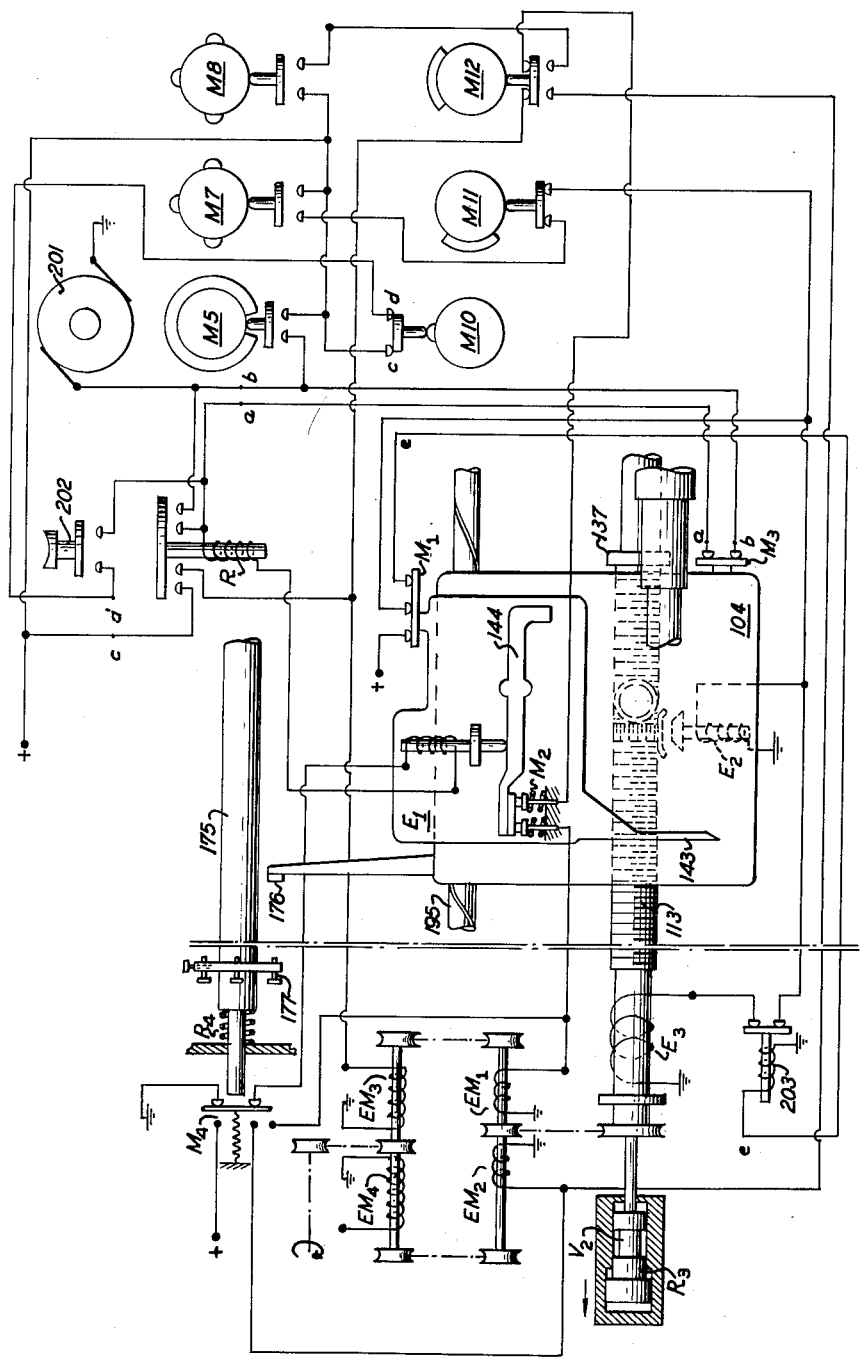
FIG. 16 is an electrical wiring diagram of the control circuits of the complete lathe shown in FIGS. 8 to 15.

On the electrical diagram in FIGS. 16a and 16b, the main members of the machine have been diagrammatically illustrated and have been designated by the same reference numbers as in the other drawings. Again for simplification purposes, no illustration is made in FIG. 16, of power circuits and control circuits acting on relays, as is actually the practice, but only of the circuits playing the part both of main circuits and of control circuits. Furthermore, for clarity purposes in the diagram, it has also been assumed that one pole of the installation is earthed.

The electric motor 201 provides motive power for the machine, that is to say it drives the spindle and the lead-screw, as well as, if necessary, various ancillary systems, such as delivery pumps for the oil required for the hydraulic actuators and for lubrication purposes. Starting is effected through the relay R which is controlled by a push-button 202. The switch shown at M3, at the bottom of the drawing, serves to short-circuit the two terminals a and b which are to be seen in the upper part of the drawing. The contacts c, d of the switch M10 are placed in series in the circuit of the push-button 202. The terminal e of the relay 203 is connected to the switch M1.

The operation of the automatic lathe described hereinbefore is as follows:

Every complete cycle needed for the automatic machining of a workpiece comprises a certain number of phases, each of which corresponds to a pass effected on the workpiece. To carry out each pass, the tool is capable of a longitudinal traversing movement (movement of the saddle along the lathe-bed) and of a copying movement (movement of the transverse tool-rest on the saddle). The longitudinal traversing movement may comprise sections of travel at varying speeds, for example: normal feed, slow feed (for abrupt shoulders, say), rapid approach, rapid return. The copying movement depends on the shape of the templet; if necessary, it may, for certain passes, take place over certain parts only of the templet and, for other passes, over other parts thereof. It is thus possible, by coordinating the conditions governing the two movements mentioned precedingly, to establish any desired automatic machining cycle in terms of the shape to be given the workpiece and hence of the shape of the templet, and according also to the machining method which it is desired to adopt (sequence of passes). All these particular conditions are determined by the configuration given to the contacts on the two function drums T1 and T2. It is now proposed to set forth all possible conditions which may arise in the machining of a workpiece, since, once these conditions have been laid down, it is a simple matter for a specialist in the art to establish any desired cycle.

I. START OF A CYCLE

The switch operating cam drums T1 and T2 are designed in such a manner that when they are at rest or in their starting position, the switches M5, M7, M8 and M11 are open, switch M10 is closed and switch M12 is in the "normal feed position" in which position switch M12 is effective to close the circuit of electromagnet EM1 over switch M2. Moreover, switch M4, the function of this switch being described subsequently, is in a position in which it closes the circuit of relay R and electromagnet E1. Furthermore, the relay R and the electromagnet E1 are connected in series.

The starting conditions are as follows:

Pressure on the push-button 202 energizes relay R and electromagnet E1 since switch M4 is closed. Relay R connects motor 201 and electromagnet EM3 with the source of positive potential (+). Upon energization of electromagnet E1, spring R1 (FIG. 9) is permitted to pivot feeler 144 causing the latter to engage templet 152, as further described hereinafter, and switch M2 remains open.

Upon rotation of the cam drums T1 and T2 from their above described rest or start position, switch M10 will be opened (and remains open during substantially a full rotation of drum T2) so as to interrupt the circuit controlled by push-button 202, the relay R remaining energized through a holding circuit a—b controlled by switch M3 as well as by switch M5 which, upon rotation of drum T1 is maintained closed during a substantially full rotation of drum T1.

It will be now apparent that the cams of the drums T1 and T2 controlling the switches M5 and M10 are so designed that, after operation has been initiated by means of button 202, the actuating cam for switch M10 causes the opening of the circuit controlled by button 202. The actuating cam for switch M5 causes the closing of the holding circuit a—b for relay R and provides a connection between motor 201 and the source (+) during an entire cycle of operation (that is, during a full rotation of the cam drum).

The cams on drum T1 for actuating the switches M7 and M8 are so designed and positioned that they close the switches M7 and M8 and consequently prepare the circuits to be controlled by the switches M11 and M12 in the selected sequence. The switches M11 and M12 are actuated by corresponding cams on drum T2 in order to control the circuits of electromagnets E2 and E3 (rapid traverse) in accordance with the position of switch M7, as well as to control the circuit of EM2 (slow feed) in accordance with the position of switch M8. The circuit of electromagnets EM1–EM3 (normal feed) is controlled by switch M12 independently of any actuation of switch M8. Broadly, before starting the machine, the switch M5 must be open and the switches M4 and M10 closed.

(a) *Rotation of the workpiece spindle*

Rotation of the spindle is maintained for the full duration of a cycle, either by the relay R exclusively during the first pass, or by the switch M5 of the function drum T1 for the rest of the cycle from the end of the first pass right up to the end of the penultimate pass, with the exclusion of the final return travel and angular movements of the stops-bar.

*Note I.*—In cooperation with the switch M3, the switch M5 of the function drum T1 permits automatic re-engagement of the start of the next phase of the cycle.

*Note II.*—Opening of the switch M5 of the function drum T1 at the end of the last phase stops rotation of the motor and prevents the automatic start of a new cycle.

(b) *Plunging of the tool-rest*

By energizing the electromagnet E1 (via the relay R); energizing of the electromagnet E1 causes the movable armature of the latter to compress the spring R2, thus freeing the spring R1. Under the thrusting effect of the spring R1, the feeler or contact-arm 144 of the feeler dips forward, causes displacement of the valve V1, and opens the switch M2, places the main chamber of the hydraulic copying cylinder 188 into the return path of the oil-feed circuit which, in conjunction with the thrust from the small constant-pressure chamber, determines the extent of the plunging movement of the tool-rest carrying the copying tool 143 as well as that of the feeler or contact-arm 144.

N.B.—The head electromagnet E1 is permanently energized during the copying process, this providing safety for the copying tool 143 through withdrawal of the tool-rest in the event of a cut in the current supply. As mentioned heretofore, the safety or security for the copying tool 143 is achieved by the action of spring R2 (FIG. 9) which tends to urge the feeler or contact arm 144 against the action of the spring R1 to move distributor V1 into a position causing return transverse motion of the tool-rest 141; spring R2 is compressed by electromagnet E1 as long as the latter is energized. Should there be a failure in the current supply, electromagnet E1 is effective to release the spring R2 which is thus allowed to urge feeler in a counter-clockwise direction to move distributor valve V1 into the spring return position thereof.

(c) *Energizing of the clutch EM3*

Energizing of the clutch EM3 in the feed-box determines the direction of feed.

II. ENGAGING NORMAL FEED TOWARDS THE HEADSTOCK

The contact-arm 144 comes into contact with the templet 152.

(1) The hydraulic copying device 187, 188, 189 places itself in a neutral condition of equilibrium.

(2) Rising of the contact-arm 144 causes the contact switch M2 to close.

Closing the contact switch M2 causes the clutch EM1 in the feed-box to be energized, so driving the lead-screw 113 in rotation as soon as the feeler has come into contact with the templet once more.

The saddle and hydraulic copying device assembly then travels in the direction of the headstock.

It should be noted that the switch M2 embodies two contacts which are short-circuited when the feeler 144 withdraws, and that these contacts are flexibly mounted so that oscillation of the feeler, during the copying process, shall have no effect on the state of said contacts. These contacts are also short-circuited when the electromagnet E1 is not energized. The switch M2 is therefore closed when at least one of the following two conditions is fulfilled, namely: feeler bearing against the templet or non-energizing of the electromagnet E1.

In contradistinction, for said switch to be open, both of the following two conditions must be satisfied, namely: the feeler not pressing against the templet and the electromagnet E1 energized.

Now, since this switch M2 governs positive feed of the saddle (longitudinal copying traverse), it will be appreciated that this movement cannot be initiated so long as the feeler is not bearing against the templet and that it will terminate as soon as the feeler lifts off the templet, which arrangement, in conjunction with hydraulic control, allows performing so-called "square" copying cycles.

III. ROTATION OF THE LONGITUDINAL-INFORMATION FUNCTION DRUM T2

Travel of the saddle produces rotation of the coarse-pitched screw 195 and, as a result, that of the longitudinal-information function drum T2.

IV. ENGAGING RAPID FEED TOWARDS THE HEADSTOCK

Engagement of rapid feed towards the headstock takes place in the same conditions as engagement of normal feed towards the headstock under selective conditions.

(1) The switch M7 of the function drum T1 is actuated.

(2) The switch M11 of the drum T2 is actuated and is maintained for the duration of rapid traverse.

These two functions allow the electromagnets E2 and E3 to be energized simultaneously. Energizing of the rapid traverse electromagnet E3 causes the lead-screw 113 to be displaced axially towards the right of the drawing with a force which is greater than that of the hydraulic spring R3 which is thus compressed, so provoking outward movement of the valve V2. Outward movement of the valve V2 places the larger chamber of the hydraulic feed cylinder in communication with the return path of the oil circuit which, under the thrusting effect of the smaller constant-pressure chamber, in turn produces rapid traverse. Energizing of the electromagnet E2 permits rapid traverse.

V. STOPPING RAPID TRAVERSE TOWARDS THE HEADSTOCK

By opening the switch M11 of the drum T2: Opening the switch M11 simultaneously cuts off current to the electromagnets E3 and E2, so restoring normal feed.

VI. ENGAGING SLOW FEED TOWARDS THE HEADSTOCK (1) The switch M8 of the function drum T1 is actuated.

(2) The switch M12 of the drum T2 is actuated and maintained active for the whole duration of the slow-down.

These two functions simultaneously allow the following:

(a) Cutting off the current to the clutch EM1.

(b) Energizing the clutch EM2 and, as a consequence, driving the lead-screw at reduced speed.

VII. ARRESTING SLOW FEED TOWARDS THE HEADSTOCK

By opening the switch M12 of the drum T2: opening the switch M12 cuts off current to the clutch EM2 and restores it in the clutch EM1, thus restoring normal feed.

VIII. END OF THE INITIAL PHASE OR PASS OF THE CYCLE

By axial displacement of the stops-bar 175: At the end of the pass, the finger 176 of the saddle repels the stop 177 which is integral with the stops-bar 175 and which serves to displace the latter axially.

(1) Control of movement of the stops-drum 162.

Axial displacement of the stops-bar 175 causes the valve V3 to open. Opening of the valve V3 allows oil under pressure to enter the upper chamber of the positioning cylinder 165 and places the lower chamber in communication with the return path of the oil circuit. The rack-piston 166 descends, positions the stops 161 and rotates the stops-bar 175. It is proposed to refer more particularly to the positioning movement of the stops later. Rotation of stops-bar 175 is initiated and from then onwards the latter takes care of energizing the motor.

(2) Actuating the switch M4.

Axial displacement of the stops-bar 175 actuates the switch M4 when the end of the pass is reached.

Actuating the switch M4 de-energizes the relay R, which in turn produces the following:

(a) Cutting off of current to the electromagnet E1.

Under the pressure of the spring R2, the valve V1 moves inwards and causes withdrawal of the tool-rest 141 by placing the larger chamber of the hydraulic copying cylinder 188 under pressure;

(b) Stopping of saddle travel by cutting out EM3;

(c) A braking effect on the lead-screw 113 by simultaneously energizing EM1 and EM2.

IX. RAPID RETURN

At the end of its withdrawal, the tool-rest actuates switch M1, which in turn energizes the electromagnet E2. Energizing of the electromagnet E2 frees the lead-screw 113.

Freeing of the lead-screw allows it to be displaced axially under the thrust of the hydraulic spring R3. The electromagnet E3 is no longer energized, for the relay 203 is fed through the switch M1.

The valve V2 is displaced and places the larger chamber of the longitudinal-traverse cylinder under pressure, thus providing rapid return.

X. END OF RAPID RETURN

This occurs when the lead-screw 113 abuts, in a state of hydraulic equilibrium, against the thrust collar 137.

(a) The coming into contact of the saddle with the thrust collar 137 causes return travel to be arrested and places the longitudinal-traverse hydraulic device in a state of equilibrium.

(b) At the same time, the switch M3 has been closed and has caused the next phase to be initiated (in the same way as the push-button 202 initiated in the first phase).

(c.) Initiation of the second phase is permitted as soon as re-arrangement of the stops 161 is terminated and M4 is not permitted to return into the position in which it closes the circuit including relay R and electromagnet E1.

XI. POSITIONING MOVEMENT OF THE STOP-CARRYING DISC 162

(a) Descent of the rack-piston 166 controls movement of the gearwheel 168 and, as explained heretofore, rotation of the disc 162 and of the function drum T1.

N.B.—On three of its four stop-carrying points, the disc 162 carries the three stops 161 providing for adjustment of the depths of each of the three roughing-cut passes.

(b) Rotation of the disc 162 neutralizes the stop 161 corresponding to the first phase of the cycle. After a 90-degree rotation, the disc 162 brings into position the stop 161 which corresponds to the second phase of the cycle, while the function drum T1 is correctly positioned for the second phase.

(c) At the same time, the sprocket wheel 184 drives, via the chain 183, the sprocket 185 and the dividing plate 178, both of which are integral with the stops-bar 175. At this stage, it is important to precisely state the order in which the movements take place: the finger 176 first repels slightly the stop 177, thus provoking a sliding movement of the slide-valve 174; the latter allows oil to enter the rotation-controlling device 165, rotational movement is initiated and gradually accelerates under the effect of the thrust produced by the cam formed by the raked face of the wedge catch 182; the stop 177 is therefore now travelling faster than the finger 176 and consequently separates from the latter; lastly, the switch M4 is actuated before the cam of the wedge catch 182 has ceased to thrust away the bar 175. Such a device is particularly suitable for very slow feeds.

In its rotation, the dividing plate consequently disengages from the wedge catch 182 and moves on to the next notch, so positioning the second stop.

Under the action of the spring R4, the stops-bar 175 returns axially to its original position, the wedge catch 182 engages into the next notch of the dividing plate 178 and the valve V3 is then in a fully home position.

Axial displacement of the valve V3 reverses the circuit in the distributor 173.

The upper chamber of the positioning cylinder is then in communication with the return feed, the lower chamber is under pressure and the rack-piston rises again, so rotating the pinion 168 together with the pawl device 169, thus rearming the latter. The ratchet wheel 171 is kept immovable thanks to the chain-type connection 183 and to the fact that the dividing plate 178 is locked and renders the bar 175 rotationally immovable.

XII. ULTIMATE OR FINISHING PASS (1) During the third or penultimate positioning movement, rotation of the disc 162 neutralizes the last stop 161. The fourth position on the drum corresponds to the before-last positioning movement and does not feature a stop.

The templet-holder oscillating assembly pivots about its axis and comes to rest against the reference stop 159.

(2) In the course of the ultimate positioning movement, rotation of the function drum T1 causes the switch M5 to open.

Opening of the switch M5 precludes any further automatic re-engagement of the start of a cycle on return to the original position.

Opening of the switch M4 at the end of the bar cuts out the relay R, thus arresting the spindle.

XIII. LIMITING THE NUMBER OF PHASES IN A CYCLE

The dividing plate 178 integral with the stops-bar 175 carries, on three of its four stop-points, the three obturators 179 controlled by the three respective screws 181.

Suppression of a given phase of the cycle is effected by plugging the corresponding notch on the dividing plate 178 by means of the respective obstructing member or obturator 179. This being so, during rotational movement of the dividing plate 178, when the obturator placed in an active position abuts against the wedge catch 182, it prevents return movement of the dividing plate, so that the bar 175 and the slide-valve 174 remain in the position providing for descent of the rack-piston 166. The gearwheel 168 continues to rotate, and positioning of the stop-carrying drum 162 is pursued, together with rotation of the dividing plate 178. Movement ceases as soon as a notch not plunged by an obturator moves into position opposite the wedge catch 182. As a consequence, to skip one or more phases of a cycle, all that is required is to prevent the corresponding stop or stops from coming to rest in an active position while positioning movement of the drum 162 is under way and this is achieved by pushing in the corresponding obturator or obturators 179.

While I have indicated the preferred embodiments of my invention, it will be apparent that it is by no means limited to the exact forms described and illustrated, but that many variations may be made in the particular structure used without departing from the scope of the accompanying claims.

What is claimed is:

1. In a templet controlled machine tool having mounting means for supporting a templet parallel with the longitudinal axis of the work piece and a tracer structure adapted to trace said templet, said mounting means including a rotatable sleeve member, a crank arm projecting from said sleeve member, a lever mounted to pivot about the same axis as said sleeve member and having two arms, a fixed stop member positioned to engage one of said lever arms upon pivotal movement of the lever in one of two opposite directions to thereby establish a predetermined limit position of the lever, means urging said lever in said one direction toward said limit position, a mechanism for selectively maintaining said lever in different predetermined positions angularly spaced from said limit position, means to adjust the angular position of said crank arm relative to said lever, and means for locking said crank arm, as adjusted by said adjusting means, to the other arm of said lever to thereby determine successive operative positions of said templet relative to the work piece in accordance with said predetermined positions of the lever.

2. In a templet-controlled machine tool according to claim 1, a plurality of supplemental abutments movably mounted on the machine-tool bed to be successively interposed in the angular path of the lever to stop the templet holding member in a plurality of successive angular positions for controlling successive operations of the tool, said supplemental abutments being constituted by rollers mounted with their axes parallel with the oscillation axis of the templet-holder on a common barrel rotatably mounted on the machine tool bed, said rollers being mounted on said barrel through eccentric pivots adapted to permit individual adjustment of the distance between the axis of each one of said rollers and the barrel axis.

3. In a templet-controlled machine tool according to claim 2, wherein said barrel is operatively associated with an automatic step-by-step angular feed device, capable of pivoting said barrel at each step by such an angle as to cause withdrawal of one abutment from the angular path of the stopping member while bringing the next following abutment into operative position on said path, means being provided to actuate said angular feed automatic device by one step at the end of each machining pass.

4. In a templet-controlled machine tool according to claim 3, wherein said barrel feed device actuating means essentially comprises a hydraulic control including a distributor responsive to the completion of a machining pass, said hydraulic control comprising a cylinder, a double-acting piston slidably mounted in said cylinder, a rack rigid with said piston and meshing with a toothed wheel, and means to connect said toothed wheel operatively with said barrel through one-way driving means.

5. In a templet-controlled machine tool according to claim 3, control electric circuits for selectively varying the speed and direction of the tool motion, "authorizing" electric circuits adapted to be completed by contacts actuated from said barrel selectively to authorize or inhibit the action of said control circuits, a nut operatively connected with the tool, a screw in mesh with said nut, further contacts incorporated in said control electric circuits and a drum rotatably connected with said screw movable in step with the tool, said drum actuating said electric circuits.

6. In a templet-controlled machine tool according to claim 3, control electric circuits for selectively varying the speed and direction of the tool motion and authorizing electric circuits adapted to be completed by contacts actuated from said barrel to selectively authorize or inhibit the action of said control circuits.

7. In a templet-controlled machine tool according to claim 3, wherein said barrel angular feed device actuating means include means to pivot said barrel upon completion of each pass by an angle at least equal to the angular distance between two successive abutments, control means having a first motion or switching motion in which it is driven in-step with the angular feed motion of the barrel and a second motion or "control motion" between a rest position in which said barrel pivoting means are not actuated and a working position in which said barrel pivoting means are actuated, resilient means to continuously urge said control means towards said rest position, means to bring said control means fugitively into said working position upon completion of each machining pass and a locking mechanism to hold said control means in said working position from the end of a machining pass until it assumes, along its switching motion stroke, a position in which the next following abutment is made operative.

8. In a templet-controlled machine tool according to claim 7, wherein said control means are essentially constituted by a hydraulic distributor having a sliding and rotating valve, said valve being rotated in step with said barrel, and wherein said locking mechanism is essentially constituted by a plate rigid with said sliding valve and one face of which is associated with a fixed stop adapted to keep said plate in operative position except for those angular positions of said valve which correspond to stop angular positions of the barrel, said face being provided with recesses to receive said fixed stop in said angular positions of said valve, said fixed stop being provided with an inclined face adapted to act as cam to push said plate axially as soon as it begins to move axially towards its working position and hence to rotate, upon completion of each machining pass, whereby said cam forming stop amplifies the initial control motion of said plate.

9. In a templet-controlled machine tool according to claim 2, wherein said barrel is operatively associated with an automatic step-by-step angular feed device, capable of pivoting said barrel at each step by such an angle as to cause withdrawal of one abutment from the angular path of the stopping member while bringing the next following abutment into operative position in said path, means being provided to actuate said angular feed automatic device by one step at the end of each machining pass, said barrel angular feed device actuating means including means to pivot said barrel upon completion of each pass by an angle at least equal to the angular distance between two successive abutments, control means having a first motion or "switching motion" in which it is driven in step with the angular feed motion of the barrel and a second motion or "control motion" between a rest position in which said barrel pivoting means are not actuated and a working position in which said barrel pivoting means are actuated, resilient means to continuously urge said control means towards said rest position, means to bring said control means fugitively into said working position upon completion of each machining pass and a locking mechanism to hold said control means in said working position from the end of a machining pass until it assumes, along its switching motion stroke, a position in which the next following abutment is made operative, said actuating means further including a mechanism for causing the templet holder to "miss" at least one abutment, said mechanism including selecting means capable of keeping said locking mechanism in locking conditon as said control means assume along their switching motion stroke, a position in which a fresh abutment is set into operative position, so that said actuating means can freely cause further pivoting of the barrel, said actuating means being capable of pivoting said barrel, upon completion of each pass, by an angle equal to the angular distance between two successive abutments added with a dead angle corresponding to the maximum number of abutments liable to be "missed."

10. In a templet-controlled machine tool according to claim 9, wherein said selecting means are constituted by members capable of selectively obstructing those recesses of said plate which correspond to abutments to be "missed," said obstructing members being slidably mounted in said plate to be selectively driven into said recesses or withdrawn therefrom under the action of manual control means.

11. In a templet-controlled machine tool having mounting means for supporting a templet parallel with the longitudinal axis of the work piece and a tracer structure adapted to trace said templet, said mounting means including a rotatable sleeve member, a crank arm projecting from said sleeve member, a lever mounted to pivot about the same axis as said sleeve member and having two arms, a fixed stop member positioned to engage one of said lever arms upon pivotal movement of the lever in one of two opposite directions to establish thereby a predetermined limit position of the lever, means to adjust the angular position of said crank arm relative to said lever, and means for locking said crank arm, as adjusted by said adjusting means, to the other arm of said lever thereby to determine different operative positions of said templet relative to the work piece.

(References on following page)

References Cited in the file of this patent

UNITED STATES PATENTS

| | | |
|---|---|---|
| 971,679 | Kirby | Oct. 4, 1910 |
| 1,030,439 | Walker | June 25, 1912 |
| 1,442,661 | Groene | Jan. 16, 1923 |
| 1,950,039 | Smith | Mar. 6, 1934 |
| 2,464,626 | Waterson | Mar. 15, 1949 |
| 2,603,117 | Turchan | July 15, 1952 |
| 2,697,373 | Siekmann | Dec. 21, 1954 |
| 2,757,565 | Fluskey | Aug. 7, 1956 |
| 2,859,290 | Grinage | Nov. 4, 1958 |

FOREIGN PATENTS

| | | |
|---|---|---|
| 64,072 | France (addition) | May 11, 1955 |
| 1,087,004 | France | Aug. 18, 1954 |
| 1,110,482 | France | Oct. 12, 1955 |
| 1,111,279 | France | Oct. 26, 1955 |
| 1,132,553 | France | Nov. 5, 1956 |